United States Patent
Wada et al.

(10) Patent No.: US 7,718,915 B2
(45) Date of Patent: May 18, 2010

(54) SHIELDING GASES FOR MAG-WELDING OF GALVANIZED STEEL SHEETS AND WELDING METHOD USING THE SAME

(75) Inventors: Katsunori Wada, Kai (JP); Toshikazu Kamei, Kai (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 170 days.

(21) Appl. No.: 11/976,121

(22) Filed: Oct. 22, 2007

(65) Prior Publication Data

US 2008/0053966 A1 Mar. 6, 2008

Related U.S. Application Data

(62) Division of application No. 11/376,088, filed on Mar. 16, 2006, now abandoned.

(30) Foreign Application Priority Data

Mar. 28, 2005 (JP) ............................ P2005-091198

(51) Int. Cl.
*B23K 9/16* (2006.01)
(52) U.S. Cl. .......................................................... 219/74
(58) Field of Classification Search ..................... 219/74
See application file for complete search history.

(56) References Cited

U.S. PATENT DOCUMENTS 3,139,506 A 6/1964 Wolff et al.

FOREIGN PATENT DOCUMENTS

| JP | 5-329682 | | 12/1993 |
| JP | 5-329682 | A * | 12/1993 |
| JP | 2668125 | | 7/1997 |
| JP | 2668125 | B2 | 7/1997 |

* cited by examiner

*Primary Examiner*—Kevin P Kerns
(74) *Attorney, Agent, or Firm*—Nixon & Vanderhye P.C.

(57) ABSTRACT

A shielding gas for MAG welding wherein a carbon steel solid wire is used for lap fillet welding of a galvanized steel sheet; wherein the shielding gas is a mixed gas composition consisting of 8 to 15% by volume of oxygen, 20 to 30% by volume of carbon dioxide, and residual % by volume of argon.

2 Claims, 4 Drawing Sheets

| WELDING RATE (cm/min) | CROSS-SECTIONAL SHAPE | |
|---|---|---|
| | GAS OF THE PRESENT INVENTION | CONVENTIONAL GAS |
| 130 |  |  |
| 150 |  |  |
| 170 |  |  |
| 190 |  |  |

FIG. 4

| WELDING RATE (cm/min) | CROSS-SECTIONAL SHAPE | |
| --- | --- | --- |
| | GAS OF THE PRESENT INVENTION | CONVENTIONAL GAS |
| 130 | | |
| 150 | | |
| 170 | | |
| 190 | | |

US 7,718,915 B2

SHIELDING GASES FOR MAG-WELDING OF GALVANIZED STEEL SHEETS AND WELDING METHOD USING THE SAME

This application is a divisional of application Ser. No. 11/376,088 filed Mar. 16, 2006 (now abandoned), which in turn claims priority of JP 2005-091198 filed Mar. 28, 2005, the entire content of which is hereby incorporated by reference in this application.

BACKGROUND OF THE INVENTION

1. Field of the Invention

The present invention relates to a MAG (metal active gas) welding method of a galvanized steel sheet wherein corrosion proofing is provided on the surface of the steel sheet.

Priority is claimed on Japanese Patent Application No. 2005-091198, filed Mar. 28, 2005, the content of which is incorporated herein by reference.

2. Description of the Related Art

In the fields of components and equipment pieces of associated with and/or used for automobiles, business equipment and the like, a galvanized steel sheet is widely used due to its excellent corrosion resistance and luster thereof. The galvanized steel sheet is a sheet in which galvanization is conducted on an iron base surface of a steel sheet.

However, there is a problem in that many pits and blowholes are generated when MAG welding is conducted on a galvanized steel sheet(s). The reason is that, since zinc has a melting point (419° C.) and boiling point (907° C.), which are lower than those of steel having a melting point (1535° C.) and boiling point (2750° C.), when zinc enters in a molten pool while welding is conducted, zinc vapor generated from the zinc is caught in the molten pool together with air, and blowholes are formed when said air and zinc vapor fail to reach the surface before the solidifying process of the welded metal is completed. When such pits are produced, a problem arises in that strength which should be achieved by the welding inherently cannot be obtained. Therefore, when pits are generated, repair of the portion where pits are generated is conducted. Furthermore, when a galvanized steel sheet is welded at high speed, further large numbers of pits, blowholes and the like are formed, and this is unpreferable.

In order to solve the problems, the following methods and the like have been conducted in general.

(1) Zinc is removed mechanically in advance from a line on which welding should be conducted. However, in the method, the number of steps for welding increase due to the addition of steps for removing zinc from the line, and this causes a problem in that the cost increases due to the addition of the steps.

(2) Occurrence of pits is prevented such that a zinc vapor generated is prevented from moving to the surface of the metal by using, for example, a welding wire, which comprises increased amounts of Si, Mn and the like, for welding a galvanized steel sheet in order to increase the viscosity of the molten metal. On the other hand, occurrence of pits and blowholes is prevented such that, for example, a welding wire comprising decreased amounts of Si, Mn and the like is used for welding a galvanized steel sheet in order to decrease the viscosity of the molten metal so that a zinc vapor rise to the surface of the metal easily. However, in fact, such wires do not provide excellent effects for preventing the generation of pits and/or blowholes.

(3) A method is proposed, for example, in Japanese Patent No. 2668125, wherein generation of pits and blowholes is prevented by using a mixed gas consisting of oxygen, carbon dioxide, and argon, which occupies the residual volume of the mixed gas, for welding. The mixed gas is used in order to prevent an occurrence of a zinc vapor by the effect of oxidation of zinc caused by oxygen. Furthermore, a method is proposed wherein generation of pits and blowholes is prevented due to the effect that surface tension of the molten metal is decreased due to oxygen and gases pores included in a molten metal rise to the surface easily. However, the disclosed welding speed thereof is only 120 cm/min.

Accordingly, the purpose of the present invention is to provide a shielding gas which does not generate pits and blowholes in a welded portion when a lap fillet welding or the like of a galvanized steel sheet is conducted in a MAG welding method.

SUMMARY OF THE INVENTION

A first aspect of the present invention is a shielding gas for MAG welding wherein a carbon steel solid wire is used for lap fillet welding of a galvanized steel sheet; wherein the shielding gas is a mixed gas composition consisting of 8 to 15% by volume of oxygen, 20 to 30% by volume of carbon dioxide, and residual % by volume of argon.

It is preferable that the composition of the mixed gas is 8.5 to 12% by volume of oxygen, 20 to 30% by volume of carbon dioxide, and residual % by volume of argon.

A second aspect of the present invention is a method for MAG welding of a galvanized steel sheet, wherein a mixed gas composition consisting of 8 to 15% by volume of oxygen, 20 to 30% by volume of carbon dioxide, and residual % by volume of argon, is used as a shielding gas to conduct a lap fillet welding for a galvanized steel sheet by using a carbon steel solid wire.

It is preferable that the composition of the mixed gas is 8.5 to 12% by volume of oxygen, 20 to 30% by volume of carbon dioxide, and residual % by volume of argon.

BRIEF DESCRIPTION OF THE DRAWINGS

FIG. 4 is a photograph which shows a cross section of a bead of a concrete example.

DETAILED DESCRIPTION OF THE INVENTION

Figure 1:
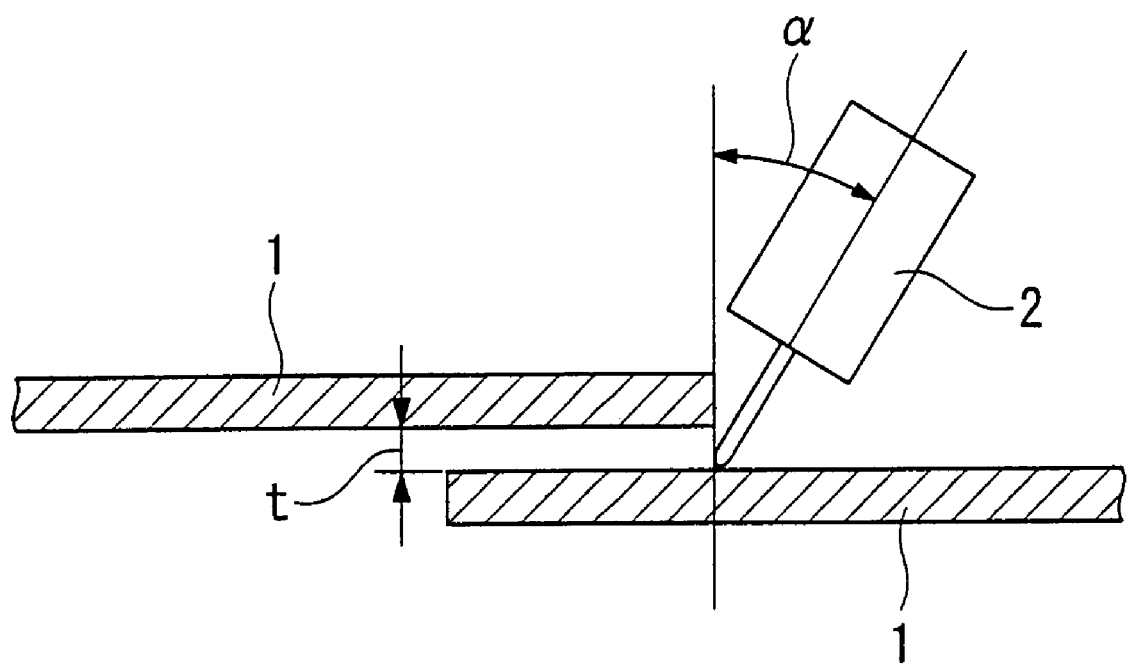
FIG. 1 is a schematic view which shows a welding state of a concrete example.

Hereinafter, the present invention is described in detail.

In the present invention, a mixed gas composition consisting of 8 to 15% by volume of oxygen, preferably 8.5 or more and/or 12% by volume or less, 20 to 30% by volume of carbon dioxide, and residual % by volume of argon, that is 72 to 55% by volume of argon, is used as a shielding gas. The shielding gas of the present invention can be used for a MAG welding method wherein welding such as lap fillet welding is conducted for a galvanized steel sheet and a carbon steel solid wire is used preferably.

Here, when an oxygen concentration in the shielding gas is less than 8% by volume, pits and blow holes tend to be produced to decrease the strength of a welded portion. When the oxygen concentration in the shielding gas exceeds 15% by volume, pits and blowholes tend to be produced and the strength of a welded portion tend to become insufficient.

When a concentration of carbon dioxide is less than 20% by volume, pits and blowholes tend to be produced and the strength of a welded portion tend to become insufficient. When the concentration of carbon dioxide is over 30% by volume, pits and blowholes tend to produced and the strength of a welded portion tend to become insufficient.

Discharge flow rate of the shielding gas from a welding torch is set in the range of 15 to 25 liters/minute in general, but it is not necessary in the invention to limit this rate in this range as long as the shielding gas can cover the surface of a molten pool.

Any kinds and conditions of a galvanized steel sheet can be used as a base metal which is welded in the present invention, and it is not particularly limited. Furthermore, in addition to the case that two or more sheets of galvanized steel are welded using the shielding gas of the present invention, such a case that the shielding gas of the present invention is used for welding a galvanized steel sheet to another type of a steel sheet(s) can also be included in the scope of the present invention.

Furthermore, as a carbon steel solid wire usable in the present invention, a welding wire such as YGW-17, YGW-18 and YGW-19, which is provided according to JIS (Japanese Industrial Standard) Z-3312 "solid wire used for MAG welding of a mild steel and a high strength steel" can be used in the present invention. Conditions for lap fillet welding are not particularly limited in the present invention, since lap fillet welding is a well-known method and any general conditions thereof are applicable in the present invention.

The MAG welding method is also a well-known welding method wherein arc welding is conducted using an active gas such as carbon dioxide as a shielding gas. The method can be conducted using a commercially available MAG welding machine. In the present invention, the aforementioned mixed gas including three kinds of gases is used as the shielding gas.

Welding arc voltage in MAG welding is generally about 14 to 36 V and welding current, which is used to provide a heat required for welding, is generally about 40 to 350 A. In the present invention, such conditions can be used but are not limited only thereto.

Due to the use of the shielding gas of the present invention, occurrence of defects such as blowholes and pits in a welding portion can be reduced. Furthermore, the welding speed can be increased. For example, a welding speed of 125 cm/min or more is possible. For example, by increasing the welding current, the welding speed can be increased to about 200 cm/min without occurrence of blowholes and pits. It is possible to further increase the welding speed to, for example, 250 cm/min or 300 cm/min or more, by adjusting the welding conditions. Specific examples of the welding speed of the invention are for example, 0 to 250 cm/min, 100 to 200 cm/min, 100 to 190 cm/min and the like, but the rate is not only limited thereto.

Hereinafter, concrete examples of the present invention are described to clarify the functional effects of the present invention.

Concrete examples and comparative examples of the shielding gas used for MAG welding of a galvanized steel sheet of the present invention are explained below for the purpose of illustration. Furthermore, in order to confirm the characteristics and effects of the shielding gas of the present invention, certain verification tests to clarify the characteristics were conducted in the following welding examples.

EXAMPLE 1

As shown in FIG. 1, two galvanized steel sheets 1 having a sheet thickness of 2.3 mm were used for Example 1. A clearance gap t between an upper galvanized sheet and a lower galvanized sheet was set to 0 mm, and an slope angle $\alpha$ of a torch 2 was provided at 30°. Then, MAG welding was conducted so that a length of a welded portion became 250 mm while welding speed was varied, and occurrence and state of pits and blowholes were confirmed.

MAG weldings were conducted such that a mixed gas consisting of argon gas, carbon dioxide gas and oxygen gas was used and the composition of the mixed gas (volume %) was varied. Here, evaluations regarding gases wherein the oxygen concentration in the shielding gas was more than 0% by volume and less than 7.5% by volume or exceeds 15% by volume, and gases wherein the concentration of carbon dioxide was less than 20% by volume or exceeds 30% by volume were omitted since it was already proved by the inventors that pits and blowholes tend to be produced and the strength of a welded portion tend to become insufficient.

For comparison, a shielding gas (Ar-20% $CO_2$), which is widely used generally for MAG welding and contains 80% by volume of Argon and 20% by volume of $CO_2$, was used.

(Welding Conditions)

Welding method: consumable electrode welding, pulsed arc welding

Base metal: galvanized steel sheet

Sheet thickness: 2.3 mm

Joint form: lap fillet welding

Welding wire: a wire according to JIS YGW-17, diameter 1.2 mm

Contact tube-to-work distance: 15 mm

Torch slope angle: 30°

Welding speed: 100 to 175 cm/min

Arc voltage: 22.5 to 24.5 V

Welding current: 225 A

In Example 1, the welding speed was varied while the welding current and total feed of wire were maintained at fixed values.

Figure 2:
FIG. 2 is a photograph which shows a cross section of a bead of a concrete example.

Results obtained from the evaluations are shown in Tables 1 and 2 and FIG. 2.

In Table 1, the number of pits observed at the welded portion is shown, and a case wherein the number of pits observed was two or less is determined as acceptable.

In Table 2, a center portion of a bead was cut and the cross section of the bead is observed to evaluate whether or not blowholes were generated, and a case wherein blowholes were not generated was determined as acceptable.

FIG. 2 is a photograph of the aforementioned cross section of the bead.

TABLE 1

| | Welding speed (cm/min) | | | | |
|---|---|---|---|---|---|
| | 100 | 125 | 150 | 175 | Acceptability |
| Ar—20% $CO_2$ | 0 | 1 | 3 | 34 | Non-acceptable |
| Ar—20% $CO_2$—7.5% $O_2$ | 0 | 0 | 3 | 13 | Non-acceptable |
| Ar—20% $CO_2$—8% $O_2$ | 0 | 0 | 1 | 3 | Non-acceptable |
| Ar—20% $CO_2$—8.5% $O_2$ | 0 | 0 | 0 | 2 | Acceptable |
| Ar—20% $CO_2$—12% $O_2$ | 0 | 0 | 0 | 0 | Acceptable |
| Ar—20% $CO_2$—15% $O_2$ | 0 | 0 | 1 | 8 | Non-acceptable |

TABLE 1-continued

| | Welding speed (cm/min) | | | | |
|---|---|---|---|---|---|
| | 100 | 125 | 150 | 175 | Acceptability |
| Ar—30% CO$_2$—8% O$_2$ | 0 | 0 | 3 | 8 | Non-acceptable |
| Ar—30% CO$_2$—8.5% O$_2$ | 0 | 1 | 2 | 0 | Acceptable |
| Ar—30% CO$_2$—12% O$_2$ | 0 | 0 | 0 | 1 | Acceptable |
| Ar—30% CO$_2$—15% O$_2$ | 0 | 1 | 3 | 0 | Non-acceptable |

(Units: number of pits)

TABLE 2

| | Welding speed (cm/min) | | | | |
|---|---|---|---|---|---|
| | 100 | 125 | 150 | 175 | Acceptability |
| Ar—20% CO$_2$ | ○ | X | X | X | Non-acceptable |
| Ar—20% CO$_2$—7.5% O$_2$ | ○ | ○ | X | X | Non-acceptable |
| Ar—20% CO$_2$—8% O$_2$ | ○ | ○ | ○ | X | Non-acceptable |
| Ar—20% CO$_2$—8.5% O$_2$ | ○ | ○ | ○ | ○ | Acceptable |
| Ar—20% CO$_2$—12% O$_2$ | ○ | ○ | ○ | ○ | Acceptable |
| Ar—20% CO$_2$—15% O$_2$ | ○ | ○ | X | X | Non-acceptable |
| Ar—30% CO$_2$—8% O$_2$ | ○ | ○ | X | X | Non-acceptable |
| Ar—30% CO$_2$—8.5% O$_2$ | ○ | ○ | ○ | ○ | Acceptable |
| Ar—30% CO$_2$—12% O$_2$ | ○ | ○ | ○ | ○ | Acceptable |
| Ar—30% CO$_2$—15% O$_2$ | ○ | ○ | ○ | ○ | Acceptable |

○: No occurrence of blowholes,
X: Occurrence of blowholes

In Example 1, the welding current was fixed at 225 A. When the welding current is fixed at 225 A even in a case of the welding speed of 175 cm/min or more, welded metal shortage may be caused, and therefore insufficient depth and leg length may be caused. The welding speed can be increased due to an increase of welding current.

EXAMPLE 2

In Example 2, MAG welding was conducted similar to in Example 1 except that the torch slope angle, welding speed, arc voltage, and welding current were changed as follows. Clearance gap t between an upper sheet and a lower sheet was set to 1 mm.

(Changed Welding Conditions)
Torch slope angle: 45°
Welding speed: 130 to 190 cm/min
Arc voltage: 24 to 27.5 V
Welding current: 280 to 350 A Since the amounts of welded metal are reduced when the welding speed is increased but the welding current was maintained, welding was conducted such that the welding speed was increased while the welding current was also increased to prevent the occurrence of insufficient amounts of welded metal.

Figure 3:
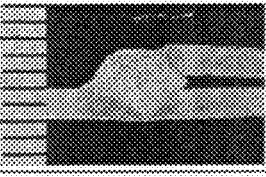
FIG. 3 is a photograph which shows a cross section of a bead of a concrete example.
Figure 3:
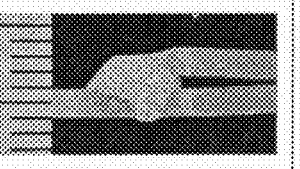
Figure 3:
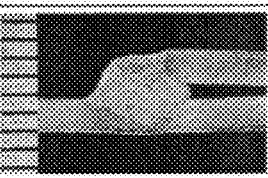
Figure 3:
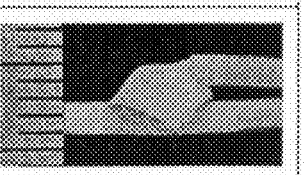
Figure 3:
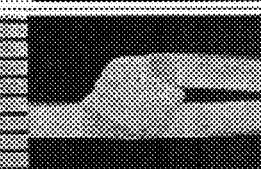
Figure 3:
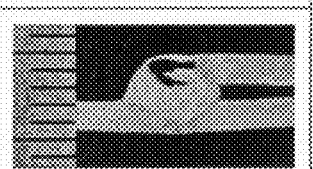
Figure 3:
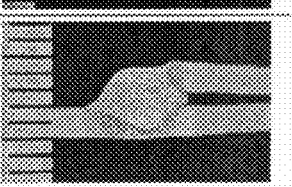
Figure 3:
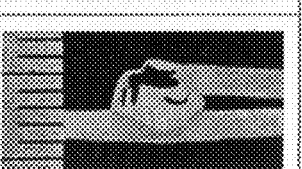

The results are shown in Tables 3 and 4 and FIGS. 3 and 4.

The results of Table 3 and FIG. 3 represent comparisons between a case wherein a shielding gas consisting of 20% by volume of carbon dioxide, 12% by volume of oxygen and residual % by volume of argon was used and a case wherein a general shielding gas consisting of 20% by volume of carbon dioxide and residual % by volume of argon, wherein gaseous oxygen was not included therein, was used.

The results of Table 4 and FIG. 4 represent comparisons between a case wherein a shielding gas consisting of 30% by volume of carbon dioxide, 12% by volume of oxygen and residual % by volume of argon was used and a case wherein aforementioned general shielding gas was used.

Evaluation and decision regarding whether blowholes were generated or not were conducted such that a case in which blowholes were not generated was represented with a sign "○" and a case in which blowholes were generated was represented with a sign "X".

TABLE 3

| Welding | Gas of the present invention | | Conventional gas | |
|---|---|---|---|---|
| speed (cm/min) | Pits (number of pits) | Blowholes | Pits (number of pits) | Blowholes |
| 130 | 0 | ○ | 0 | ○ |
| 150 | 0 | ○ | 0 | ○ |
| 170 | 0 | ○ | 0 | X |
| 190 | 0 | ○ | 0 | X |

TABLE 4

| Welding | Gas of the present invention | | Conventional gas | |
|---|---|---|---|---|
| speed (cm/min) | Pits (number of pits) | Blowholes | Pits (number of pits) | Blowholes |
| 130 | 0 | ○ | 0 | ○ |
| 150 | 0 | ○ | 0 | ○ |
| 170 | 0 | ○ | 0 | X |
| 190 | 0 | ○ | 0 | X |

When the welding current was increased to the maximum value of 350 A, it was possible to increase a welding speed at 190 cm/min or more. However, in this case, the welding speed of 190 cm/min was the maximum rate substantially when the current is 350 A. That is, there was a possibility that insufficient throat, undercut, and/or bead convexity were generated when the welding speed exceeds 190 cm/min. However, by considering the results of Example 1, it is clear that it is possible to overcome such problems by increasing the welding current.

Results of Examples 1 and 2 were collated, and the relationship between the composition of shielding gases and the occurrence of generated pits and blowholes is shown in Table 5.

TABLE 5

| | Pits | Blowholes |
|---|---|---|
| Ar—20% CO$_2$ | X | X |
| Ar—20% CO$_2$—7.5% O$_2$ | X | X |
| Ar—20% CO$_2$—8% O$_2$ | Δ | Δ |
| Ar—20% CO$_2$—8.5% O$_2$ | ○ | ○ |
| Ar—20% CO$_2$—12% O$_2$ | ⊚ | ○ |
| Ar—20% CO$_2$—15% O$_2$ | Δ (which is nearly x) | X |
| Ar—30% CO$_2$—8% O$_2$ | Δ (which is nearly x) | X |
| Ar—30% CO$_2$—8.5% O$_2$ | ○ | ○ |
| Ar—30% CO$_2$—12% O$_2$ | ○ | ○ |
| Ar—30% CO$_2$—15% O$_2$ | Δ | ○ |

As shown in Table 5, it is clear that generation of pits and/or blowholes can be suppressed due to the use of a mixed gas consisting of 8 to 15% by volume of gaseous oxygen, preferably 8.5 to 12% by volume, and 20 to 30% by volume of carbon dioxide, and argon, which occupies the residual volume, as a shielding gas.

Here, in Table 5, a sign "⊚" in the column for pits represents that pits are not generated at all; a sign "○" represents that some pits are generated but the number of pits is smaller than the reference number; a sign "Δ" represents that pits are generated and the number thereof is somewhat larger than the reference number; and a sign "X" represents that a lot of pits are generated. Furthermore, a sign "○" in the column for blowholes represents that blowholes are not generated at all; a sign "Δ" represents that blowholes are generated at the welding speed of 175 cm/min or more; and a sign "X" represents that blowholes are generated at the welding speed of 125 cm/min or 150 cm/min or more.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

In the present invention, generation of pits and blowholes can be prevented by using a shielding gas for MAG welding, wherein the gas is a mixed gas of three kinds consisting of 8 to 15% by volume of oxygen, preferably 8.5 to 12% by volume, 20 to 30% by volume of carbon dioxide, and residual % by volume of argon. Furthermore, due to the effect of the shielding gas, the welding speed can be increased, for example, a welding speed of 125 cm/min or more is possible.

What is claimed is:

1. A method for MAG welding of a galvanized steel sheet, wherein a mixed gas composition consisting of 12 to 15% by volume of oxygen, 20 to 30% by volume of carbon dioxide, and residual % by volume of argon, is used as a shielding gas to conduct lap fillet welding for a galvanized steel sheet by using a carbon steel solid wire.

2. The method according to claim 1, wherein a welding speed of the lap fillet welding is 125 cm/min or more.

\* \* \* \* \*